United States Patent

[11] 3,592,961

[72] Inventor Alan G. Grace
San Carlos, Calif.
[21] Appl. No. 886,094
[22] Filed Dec. 18, 1969
[45] Patented July 13, 1971
[73] Assignee Wistel Company
San Mateo, Calif.

[54] FINE PHASE ERROR-COMPENSATING SYSTEM AND METHOD
15 Claims, 6 Drawing Figs.

[52] U.S. Cl. 178/5.4 CD, 178/5.2 R, 328/134
[51] Int. Cl. H04n 9/02, H04n 1/28
[50] Field of Search 178/5.2, 5.4, 5.4 CD, 69.5, 6.6 TC; 328/134; 307/232

[56] References Cited
UNITED STATES PATENTS

| | | | |
|---|---|---|---|
| 3,225,134 | 12/1965 | Jensen | 178/5.4 CD |
| 3,312,780 | 4/1967 | Hurst et al. | 178/5.4 CD |
| 3,342,931 | 9/1967 | Yunde | 328/134 X |
| 3,521,173 | 7/1970 | Farley | 328/134 |

*Primary Examiner*—Richard Murray
*Attorney*—Fowler, Knobbe & Martens

ABSTRACT: Small amounts of undesired change in the phase of a tape recorded video signal relative to a reference signal, typically caused by tape speed fluctuation, are compensated by a time delay system in which the video signal is reproduced by a lagging output signal. The amount by which the output signal lags behind the video signal is varied to compensate for the undesired phase changes of the video signal relative to the reference signal. To achieve the variable time lag, each zero crossing of the video signal is used to initiate a voltage ramp, and each voltage ramp causes the output signal to reproduce that zero crossing with a slight lag when that voltage ramp reaches a preset level, determined by the relative phases of the output signal and the reference signal.

INVENTOR.
ALAN G. GRACE
BY
FOWLER, KNOBBE
& MARTENS
ATTORNEYS.

INVENTOR.
ALAN G. GRACE
BY
FOWLER, KNOBBE & MARTENS
ATTORNEYS.

INVENTOR.
ALAN G. GRACE

BY
FOWLER, KNOBBE & MARTENS.
ATTORNEYS.

INVENTOR.
ALAN G. GRACE
BY
FOWLER, KNOBBE
& MARTENS
ATTORNEYS.

INVENTOR.
ALAN G. GRACE
BY
FOWLER, KNOBBE
& MARTENS
ATTORNEYS.

INVENTOR.
ALAN G. GRACE

BY
FOWLER, KNOBBE
& MARTENS
ATTORNEYS.

FINE PHASE ERROR-COMPENSATING SYSTEM AND METHOD

TABLE OF CONTENTS

| | Col. No. |
|---|---|
| A. Abstract of the Disclosure | Front page |
| B. Background of the invention | 1 |
| C. Summary of the invention | 2 |
| D. Brief description of the drawings | 2 |
| E. Description of an exemplary system incorporating the invention | 2 |
| 1. The nature of the recorded video signal | 2 |
| 2. Organization and operation of the system | 4 |
| 3. Details of the exemplary system | 8 |
| a. The ramp generator | 8 |
| b. The threshold level detectors | 9 |
| c. The color burst sampling pulse source | 10 |
| (1) In general | 10 |
| (2) In detail | 10 |
| d. The injection locked oscillator | 14 |
| e. The phase comparator and time base unit | 14 |

BACKGROUND OF THE INVENTION

The present invention relates to video signal recording apparatus and in particular to a system and method for introducing a variable time delay into the recorded video signal so as to compensate for undesirable time base errors to which that signal is subjected due to tape speed fluctuations during the reproduce mode of the recorder.

Any system passing an angle modulated spectrum of frequencies that introduces into the spectrum a further frequency or angle modulation must include some means to remove the effect of the additional modulation. An example of such a system is a video tape recorder processing a frequency modulated waveform. Since the video tape recorder is synchronized during the recording process to a reference frequency source, unless the recorder is absolutely time base stable with respect to its reference, i.e. introduces no velocity variation in its speed, it will introduce an additional frequency modulation of the input signal. In the case of a video recorder for processing a standard color video signal as used in the United States, the system specifications are such that any horizontal line compared to its previous or succeeding horizontal line must not have a time base shift of more than 2½ 1/2 nanoseconds. Without some compensating device, this limitation would impose an impossibly strict speed tolerance on the transport mechanism of a color video tape recorder.

One known system for effecting compensation for time base errors introduced by tape velocity variations utilizes a pair of delay lines, one for introducing a coarse time correction, and the other for adding a finer time variation. In the coarse system, the horizontal sync pulses carried by the composite video waveform are compared during the reproduce mode with a reference frequency, and the instantaneous time error between the horizontal sync pulse and the reference is converted into an error signal which is used to control the amount of delay introduced by the delay line. The delay line is composed of conventional lumped inductive elements and voltage variable shunt capacitive elements whose value is varied in response to the error signal so as to change the time delay of the delay line.

By means of the coarse time delay system, relatively large time delays can be introduced, so as to reduce the time base error of the video signal to approximately 20 nanoseconds. A second, fine delay system is then used to introduce much smaller and more precisely controlled time delays so as to reduce the ultimate time base error of the video signal to less than a nanosecond.

Currently used delay lines have two disadvantages. First, as the value of the voltage variable capacitors is changed, the characteristic impedance of the line is also changed, since it is a function of the value of the voltage variable capacitors. In an ideal system, the characteristic impedance of the delay line, i.e. the impedance which it presents at its input to a signal, should match the output impedance of the source of that signal in order to avoid signal reflections on the delay line. Clearly, the characteristic impedance of the delay line will deviate from its ideal value as the values of its component capacitors are modified in order to change its delay.

A second disadvantage of the delay lines is their cost, which is high because they require capacitors whose values are matched to very close tolerances at a given voltage and whose values must follow a prescribed curve as their controlling voltage is changed.

SUMMARY OF THE INVENTION

In accordance with the present invention a method and a system are provided for effecting fine compensation for time base errors without using a delay line.

In brief, fine compensation for the drifting of an alternating input signal, such as a composite video signal, from a predetermined phase relationship with respect to an alternating reference signal is provided by generating two series of voltage ramps, one series in response to positive-going zero crossings and the other in response to negative-going zero crossings of the input signal. An output signal of the same frequency as the input signal is generated, with positive-going and negative-going zero crossings being initiated in response to the first and second series of voltage ramps reaching a first and a second preset voltage level respectively. These voltage levels are selected so that each zero crossing of the input signal is reproduced by a corresponding zero crossing of the output signal. Moreover, the voltage levels are altered as a function of the phase of the output signal relative to the phase of the reference signal, thereby to alter the delay between a given zero crossing of the input signal and the corresponding zero crossing of the output signal until the phase relationship between the output signal and the reference signal reaches a desired relationship.

The components which are required to achieve a variable time delay in the manner described are commonly available and relatively inexpensive. Furthermore, a system operating in the manner described does not suffer from the disadvantage of an inconstant characteristic impedance, since the characteristic impedance of the system is not a function of the instantaneous time delay effected by it.

BRIEF DESCRIPTION OF THE DRAWINGS

The present invention and its advantages will be more clearly understood with reference to the following description of a preferred embodiment thereof taken in conjunction with the accompanying drawings in which.

DESCRIPTION OF AN EXEMPLARY SYSTEM INCORPORATING THE INVENTION

1. The Nature of the Recorded Video Signal

Figure 1:
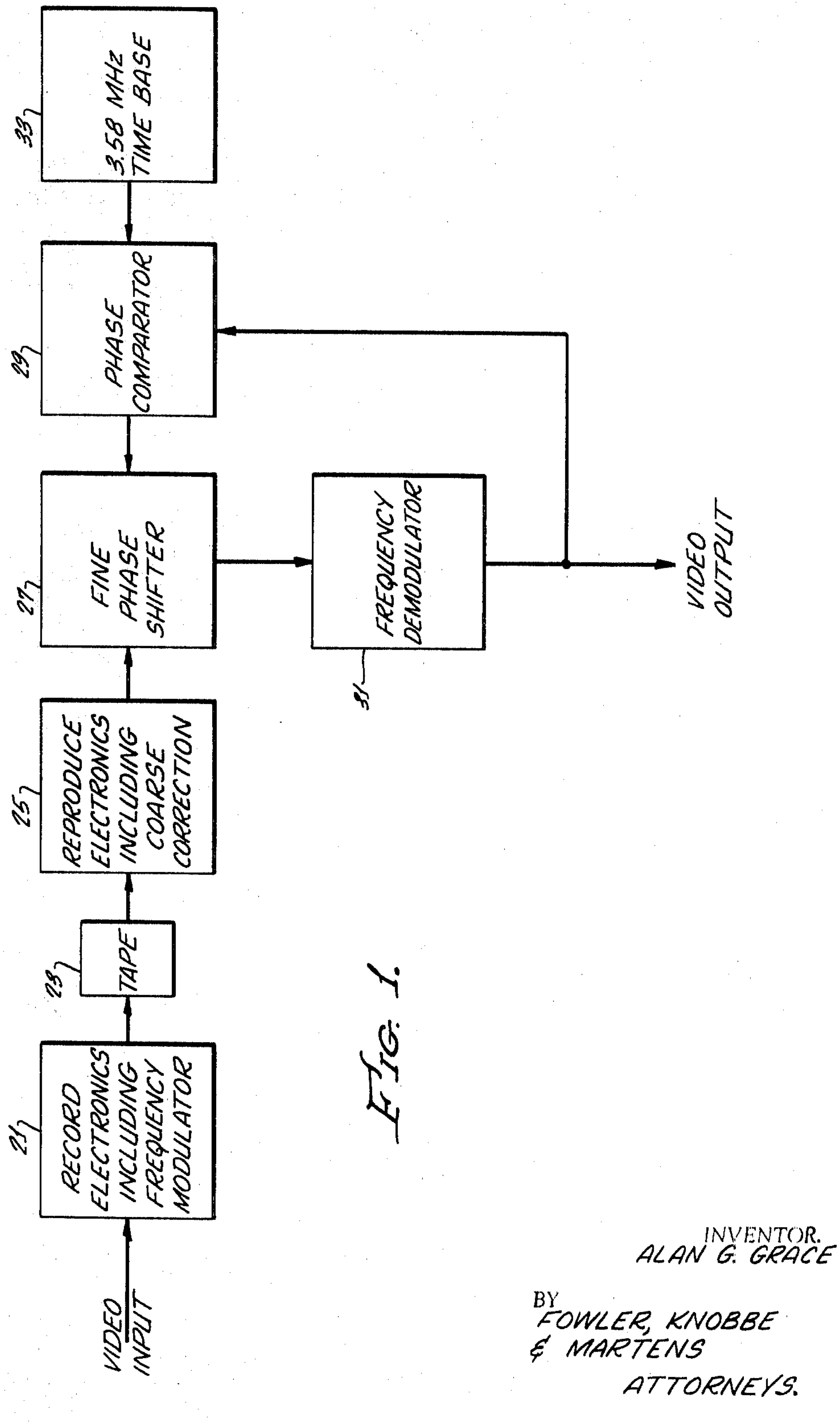
FIG. 1 is a partial block diagram of a video tape recorder illustrating generally the function and place therein of the error-compensating system of the present invention.
Figure 2:
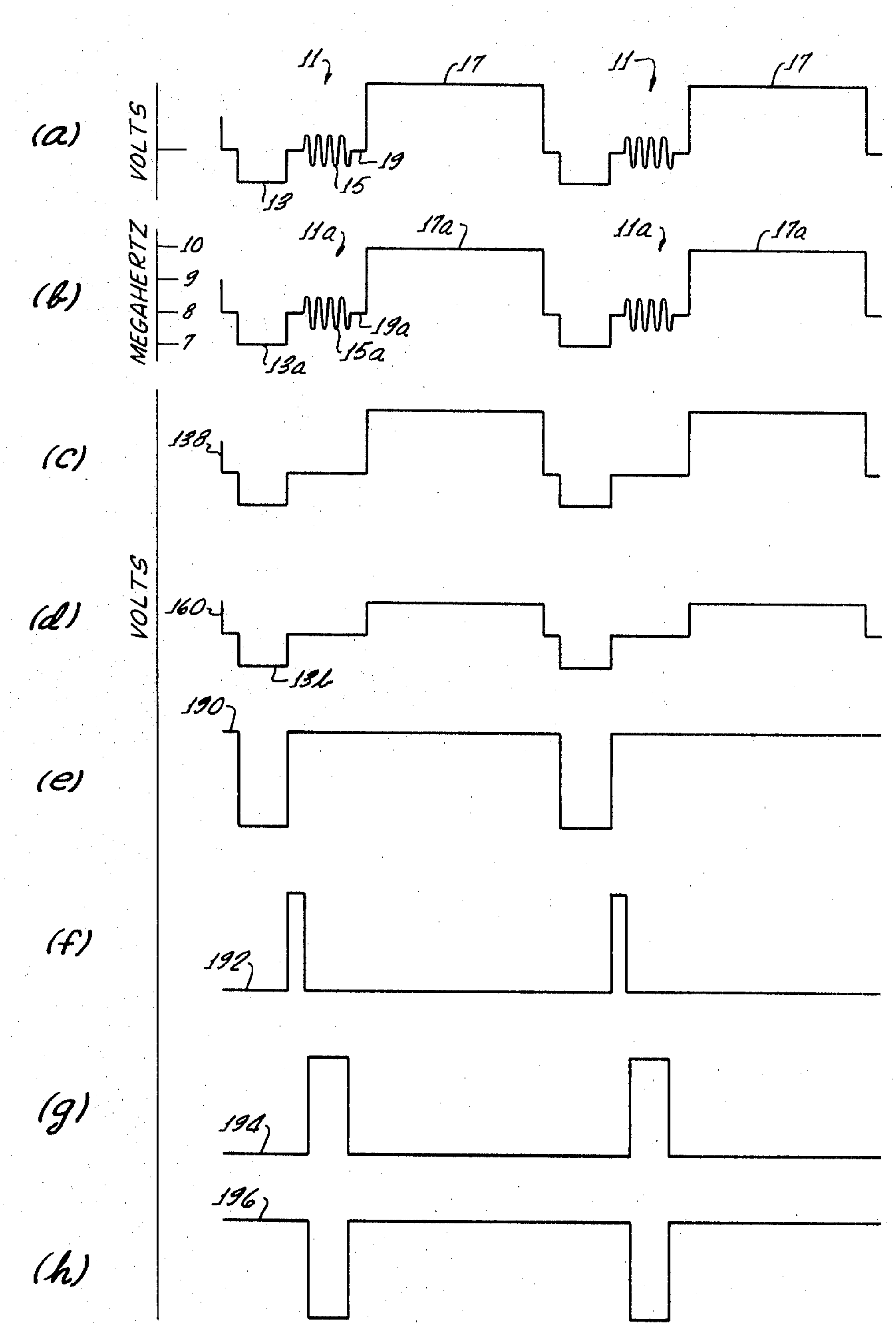
FIG. 2 is a waveform diagram illustrating an amplitude modulated composite color video waveform and a corresponding frequency modulated waveform into which the amplitude modulated waveform is converted for processing in a video tape recorder, and also illustrating the timing of pulses used to extract the color burst portion of the composite video waveform for phase comparison with a reference signal.

The path of a video signal during processing in a video recorder is shown generally in FIG. 1. Before recording, the composite video waveform which includes timing pulses as well as the video signal, carries much of its information content in amplitude modulated form. Thus, as shown in FIG. 2a a typical composite video waveform 11 includes a negative excursion 13, known as the horizontal sync pulse, a series of sinusoidal excursions 15 at a frequency of 3.58 megahertz (MHz.), called the "color burst," and a positive excursion 17 which is the video signal and which actually carries the information necessary to produce one line of a television picture frame. For simplicity, the video signal 17 is shown at its white level, that is at the level where the signal is to represent a totally white point, i.e. a point of maximum brightness, on the screen. Conversely, the signal 17 would be at the base line 19 of the waveform 11, known as the black level, if it were to represent a totally black point, i.e. a point of minimum brightness, on the screen. Normally, the video signal 17 fluctuates within a range defined by the black and white levels 19 and 17, to reflect instantaneous picture brightness variations during the sweep of a given line.

For reasons which are well understood in the field of video recording, a significant reduction may be achieved in the bandwidth which is required to record a composite video waveform by converting the amplitude modulation of the waveform into frequency modulation. FIG. 2b represents the composite video waveform 11 of FIG. 2a converted by a frequency modulator in the record electronics 21 of the recorder into a waveform 11a whose information content is carried by the deviation of its frequency from a selected frequency reference level. Thus, in FIG. 2b the frequency reference level corresponding to the black level 19 of waveform 11 in FIG. 2a is 8 MHz. The horizontal sync pulse 13 is represented by an excursion of the signal 11a in FIG. 2b from the reference level of 8 MHz. to a value of 7 MHz. Similarly, the color burst 15 of the waveform 11 in FIG. 2a is reproduced by alternation of the waveform 11a between 7½ MHz. and 8½ MHz. Finally, the white level of the amplitude modulated signal 11 is reproduced in the corresponding frequency modulated signal 11a by an excursion of that signal to a 10 MHz. frequency.

The frequency modulated video waveform 11a appearing at the output of the record electronics 21 (FIG. 1) is applied to a recording head (not shown) and is recorded upon a video tape, shown as the block 23.

During the reproduce mode of the video recorder, the frequency modulated video waveform 11a is reproduced by the reproduce electronics section 25 of the recorder, a section which includes means for effecting a coarse correction to compensate for errors which result from relatively large deviations of the tape from a standard speed during either recording or reproducing. One method of accomplishing this is to compare the time of occurrence of the horizontal sync pulse 13 with that of a periodically recurring internally generated timing pulse, and advancing or retarding the entire frequency modulated video waveform 11a until the horizontal sync pulse 13a is brought into phase agreement with the timing pulse. This aspect of time base error correction is not a part of the present invention. The present invention is directed toward making a more precise time correction on a smaller time scale, corrections which the coarse system cannot make with sufficient accuracy. It should be understood, however, that, in most instances, the coarse time base error correction is a prerequisite toward the successful use of the fine error correcting system of the present invention because the range of correction of the latter is not sufficient to compensate for all time base errors which can occur.

Basically, the fine error correcting system of the present invention includes a fine phase shifter 27 which receives at one of its inputs an input signal which is the coarsely corrected output of the reproduce electronics 25. At its other input the fine phase shifter 27 receives a control signal produced by a phase comparator 29. The phase shifter 27 reproduces the input signal which it receives from the reproduce electronics 25, but with a delay whose extent is a function of the output of the phase comparator 29.

The delayed output signal produced by the phase shifter 27 is converted into an amplitude modulated signal, such as that shown in FIG. 2a, by a frequency demodulator 31.

To achieve the proper amount of time delay, the color burst portion 15 of the composite video waveform 11 (FIG. 2a) at the output of the frequency demodulator 31, i.e. the demodulated output of the fine phase shifter 27 is compared by means of the phase comparator 29 with a 3.58 MHz. reference signal produced by a time base circuit 33. It will be understood that a shift in the phase of the color burst 15 of the reproduced composite video waveform 11 relative to the phase of the reference waveform will be indicative of the time or phase variation of the entire composite video waveform relative to the frequency reference.

Thus, the time delay introduced by the phase shifter 27 is continuously varied in accordance with the relative phase of the reference signal and the reproduced composite video waveform 11 at the output of the demodulator 31 so as to maintain a predetermined phase relationship between them.

2. Organization and Operation of the System

Figure 3:
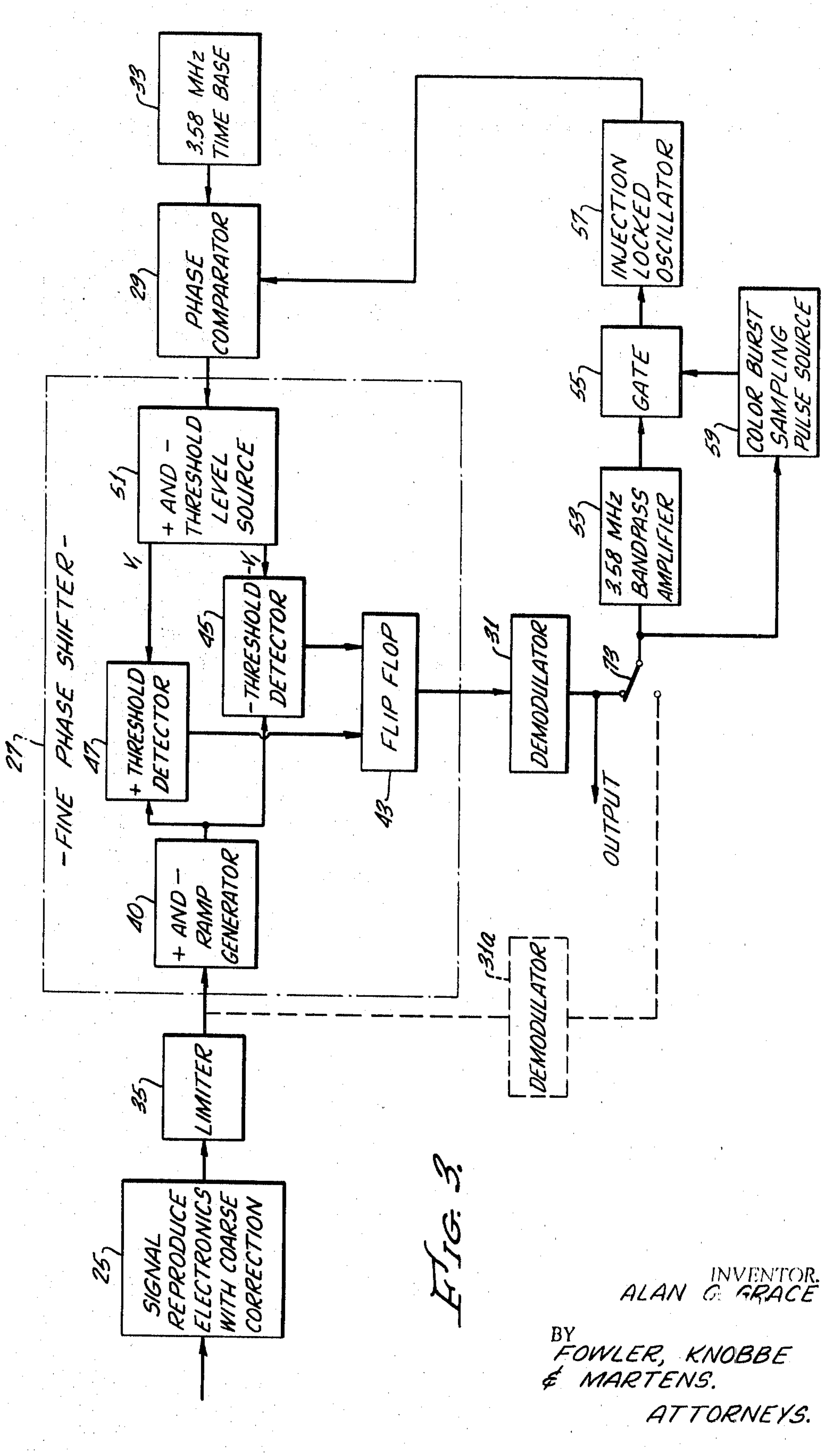
FIG. 3 is a simplified block diagram of a time error compensating system for use in a video recorder and incorporating features of the present invention.

Referring now to FIG. 3, the fine phase correcting system of the present invention will be discussed in greater detail. To effect a time delay, two series of voltage ramps are generated, with successive ramps of the respective series being initiated in response to successive zero crossings of the video signal component of the composite color video waveform in a given direction. The system of FIG. 3 is made responsive to zero crossings of the video signal component, shown in FIG. 4 as the waveform 34, by means of a voltage limiter 35 which serves to convert the frequency modulated output 34 of the signal reproduce electronics 21 into a square wave, shown in FIG. 4 as the waveform 37. The entire information content of the waveform 37 is represented by the instants at which the signal crosses zero either in a negative-going or a positive-going direction. In the preferred embodiment of the invention shown in FIG. 3, the two series of voltage ramps both form part of a single waveform, which alternates between two predetermined voltage levels, as illustrated by the waveform 39 in FIG. 4. It can be seen that each negative-going ramp portion 39a of the waveform 39 is initiated in response to a negative-going zero crossing of the video signal 34 and that each positive-going ramp portion 39b of the waveform 39 is initiated in response to a positive-going zero crossing of that signal.

Figure 4:
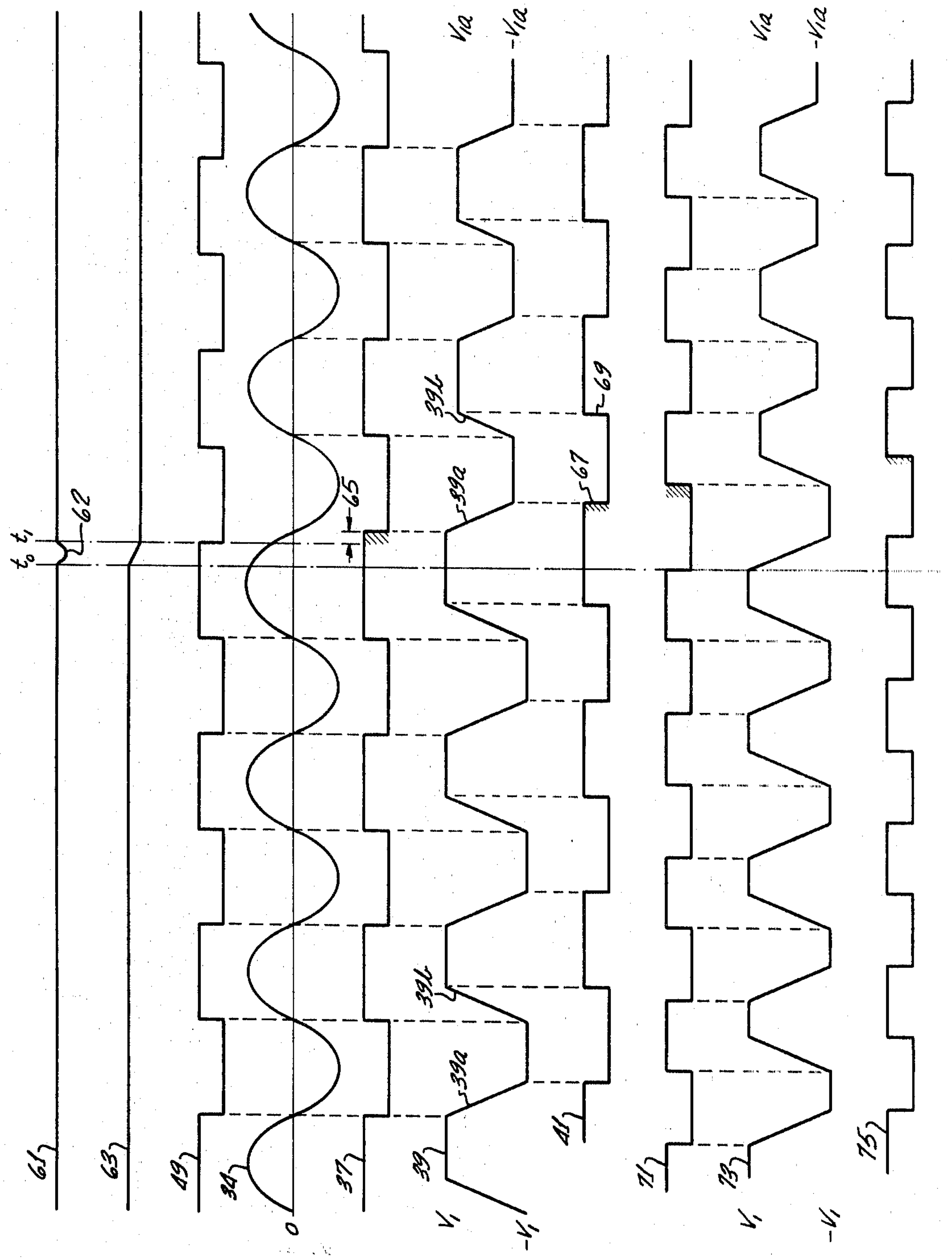
FIG. 4 is a series of waveform diagrams illustrating the manner in which a variably delayed output signal is derived from the video input signal applied to the system of FIG. 3.

A second principal function performed by the system of FIG. 3 is to produce an alternating output signal which crosses zero in a given direction in response to respective ones of successive ramps of one of the two series of ramps 39a and 39b reaching a first reference level, and which crosses zero in the opposite direction in response to successive ramps of respective ones of the other of the two series of ramps reaching a second reference level. The alternating output signal just referred to is shown in FIG. 4 as the waveform 41. The waveform 41 is produced by a flip-flop 43 or similar bistable device which is switched to one of its stable states when the negative-going ramps 39a reach a first reference level, shown as $-V_1$ in FIG. 4. The flip-flop 43 is switched into its other stable state when the positive-going voltage ramps 39b reach the other predetermined voltage level, shown in FIG. 4 as $V_1$. Each change of the flip-flop 43 from one of its stable states to the other results in its output signal 41 crossing zero in a given direction. A pair of threshold detectors 45 and 47 are provided to reverse the state of the flip-flop 43 each time a respective one of the negative and positive ramps 39a and 39b reach a corresponding one of the reference levels $-V_1$ and $V_1$.

A comparison of the waveform 41 representing the output of the flip-flop 43 with the squared video signal 37 reveals that a precise amount of delay occurs between each negative-going zero crossing of the signal 37 and the corresponding negative-going zero crossing of the waveform 41 and that a similar delay occurs between the positive-going zero crossing of the respective signals. Moreover, it is seen that the delay between the negative-going zero crossing of the respective signals corresponds to the period of time taken by each negative-going ramp 39*a* and that the positive-going ramps 39*b* determine the delay between the positive-going zero crossings of the respective signals. In accordance with the invention, the time delays introduced by the negative and positive ramps 39*a* and 39*b* are altered by varying the values of the reference levels $V_1$ and $-V_1$. More particularly, means are provided for generating the first and second reference levels $V_1$ and $-V_1$ as a function of the relative phases of the output signal 41 and an alternating reference signal produced by the time base 33.

The latter signal is shown in FIG. 4 as the waveform 49. 1 the phase of the output signal 41 advances relative to the phase of the reference signal 49, the voltage reference levels $V_1$ and $-V_1$are changed in such a way as to increase the time durations of the ramps 39*a* and 39*b*. This will have the effect of retarding the output signal 41, thereby reestablishing the desired phase relationship between it and the reference signal 49. A similar corrective action is taken in the case where the output signal 41 is unduly retarded, by so changing the voltage levels $V_1$ and $-V_1$ as to diminish the time durations of the ramps 39*a* and 39*b*, thereby reducing the time delays between the squared input signal 37 and the output signal 41.

In addition to the phase comparator 29, another principal component of the means for producing the reference levels $V_1$ and $-V_1$ is a threshold level source 51 which is operative to convert the output of the voltage comparator 29, typically a single voltage level, into a pair of voltage levels having the same magnitude, but each being of the opposite polarity. A particularly effective circuit for deriving the two reference levels will be pointed out hereinafter with reference to FIG. 5.

If the input to the system of FIG. 3 were not a composite video waveform, but were instead a simple sinusoidal signal whose phase was subject to spurious variation relative to the phase of a reference signal, the output of the demodulator 31 could be applied directly to the phase comparator 29 for comparison with the reference signal. Indeed, in certain applications of the present invention where the input signal is not frequency modulated before being recorded on tape or otherwise being subjected to spurious phase disturbances, the demodulator 31 could also be dispensed with and the output of the flip-flop 43 could be applied directly to the phase comparator 29 for comparison with the output 49 of the time base 33.

If, however, a composite video waveform is the input signal being applied to the system, as shown in FIG. 3, then, due to the complexity of that waveform, the output of the demodulator 31 must be processed further before it can be compared by the phase comparator 29 with the reference waveform 49. In particular, the color burst 15 of the composite video waveform 11 must be isolated and its phase must be compared with the phase of the reference waveform 49. This is accomplished by first passing the output of the demodulator 31 through a 3.58 MHz. band-pass amplifier which serves selectively to amplify signals in the frequency range of the color burst 15. The output of the band-pass amplifier 53 is fed through a gate 55 to an injection locked oscillator 57. The gate 55 is opened by means of a color burst sampling pulse source 59 during those periods of time in which the color bursts 15 occur. At all other times the gate 55 is closed, so that only the color bursts are applied to the injection locked oscillator 57. The oscillator 57 serves to convert the intermittent color bursts 15 into a continuous signal which is at a frequency and phase corresponding to the frequency and phase of the color bursts. Thus, a continuous signal representing the phase of the color bursts 15 is applied from the output of the injection locked oscillator 57 to the phase comparator 29 for comparison with the reference signal waveform 49 from the time base 33.

It will be helpful to consider at this point how the system of FIG. 3 will react to a phase error caused by a momentary perturbation in the speed of the tape either during recording or during playback. Let it be assumed that the tape was moved at a constant speed during recording, but that its speed was momentarily reduced during playback. This is shown in FIG. 4 by the 0, 61, which is shown near the top of FIG. 4, to have a constant speed up to an instant marked $t_0$, at which time the tape speed drops temporarily at 62 to a lower level, returning at time $t_1$ to its original, proper level. The resulting phase error between the video input signal 34 and the reference signal 49 is shown by the waveform 63. The waveform 63 is shown as having a first level representing a given phase relationship between input signal 34 and the reference signal 49 up to the point $t_0$and a second level representing the changed phase relationship between the two signals 34 and 49 after the end of the speed perturbation 62, at time $t_1$. The effect of this speed perturbation and phase change is also shown in FIG. 4 by a delay in the time at which the first crossover following time $t_0$ occurs in the video signal 34 as well as in the squared video signal 37. The amount of the delay is indicated by the shaded area 65 on the squared waveform 37.

In the illustrated example in FIG. 4 the signals 34 and 37 are in phase with the reference waveform 49 up to the time $t_0$. However, as a result of the delay 65 introduced by the speed perturbation 62, a constant lag is introduced between the reference waveform 49 and the signals 34 and 37 after the time $t_1$. The output 41 produced by the periodic reversals of the state of the flip-flop 43 normally lags the squared video input signal 37 by a predetermined amount. Prior to the time $t_0$ this amount corresponds to the time taken for the negative-going ramp 39*a* to change from a potential of $V_1$ to a potential of $-V_1$. As a result, a predetermined phase relationship is established between the output signal 41 and the signal waveform 49. This relationship continues undisturbed until the perturbation 62 at which time the delay introduced into the input signal 34 has the tendency of introducing a corresponding delay into the output signal 41. This tendency is reflected by the delay in the first zero crossing of the output signal 41 following the perturbation 62, as indicated by the shaded area 67. It will be observed, however, that the delay 67 incurred by the output signal 41 is smaller than the delay 65 undergone by the input signal 34. It is also observed that the phase of the output signal 41 returns to its previous relationship relative to the reference signal 49 beginning with the second zero crossing 69 after the speed perturbation 62. The reason why the first zero crossing of the output signal 41 is not delayed as much as that of the input signal 34, and why the second zero crossing 69 of the output signal 41 is not delayed at all, is that the potential difference between the two reference levels $V_1$ and $-V_1$ used to time the triggering of the flip-flop 43 has been reduced as indicated by the new reference levels $V_{1a}$ and $-V_{1a}$ next to the waveform 39 in FIG. 4. Thus, by raising the potential of the lower reference level from $-V_1$ to $-V_{1a}$ the duration of the first voltage ramp 39*a* following the time $t_0$is reduced sufficiently to eliminate half of the delay 65 incurred by the clipped input video signal 37. The rest of that delay is eliminated by the shortening of the subsequent positive-going voltage ramp 39*b*, which now has to traverse only the difference in potential between the levels $-V_{1a}$ and $V_{1a}$. The reference levels will remain at the values $V_{1a}$and $-V_{1a}$ until there is another change in the phase of the squared input signal 37 relative to the reference signal 49.

It is worthy of note that an undesired change in the phase of the video input signal 34 will be compensated by the system of the present invention regardless of the frequency of that signal, which it will be recalled may vary from 7 to 10 megacycles in a typical case (FIG. 2*b*), so long as its frequency remains within the operating range of the system. This fact is illustrated by waveforms 71, 73, and 75 of FIG. 4. The waveform 71 is similar to the squared video signal waveform 37, representing a squared video input signal but at a higher frequency. The waveform 73 is similar to the waveform 39, and represents the series of voltage ramps which are generated in response to the zero crossings of the waveforms 71. The values of the voltage levels at which the negative-going and positive-going voltage ramps of the waveform 73 terminate are the same as in the case of the waveform 39, i.e. $V_1$ and $-V_1$. The slopes of the ramps of the waveform 73 are also the same as those of the ramps 39*a* and 39*b* Consequently, the amount of delay introduced by the system between its input, shown after squaring as the waveform 71, and its output, the waveform 75, is the same as that introduced for the lower frequency input represented in squared form by the waveform 37. Similarly, when the values of the reference voltages are changed from $V_1$, $-V_1$ to $V_{1a}$ and $-V_{1a}$ respectively, the resulting change in the delay introduced by the system will be the same as was the case for the lower frequency input, represented by the waveform 37. Reference to the waveforms 71, 73, and 75 after the interval $t_0$–$t_1$ shows that the change in the reference levels from $V_1$, $-V_1$ to $V_{1a}$, $-V_{1a}$ returns the output waveform 75 to the same phase relative to the reference waveform 75 to the same phase relative to the reference waveform 49 as it had prior to that time period. In other words, a given tape speed error causes the system of FIG. 3 to take corrective action by changing the delay between its input and its output, and this action is equally effective, regardless of the instantaneous frequency of the video signal at its input.

Summarizing the foregoing analysis, that portion of the output signal 41 produced by the fine phase shifter 27 and demodulated by the demodulator 31 which corresponds to the color burst 15 carried by the composite color video waveform 11 is compared in phase with the reference signal 49 from the time base 33. Any deviation of the phase of the color burst 15 in the output signal 41 relative to the phase of the reference signal 49 is detected by the phase comparator 29, causing its output to change, and the outputs $V_1$ and $-V_1$ of the threshold level source 51 to change in such a way as to counteract and eventually eliminate the detected phase shift in the output signal.

While the foregoing arrangement is to be preferred, the invention could also be practiced by comparing the phase of the color burst of the composite video waveform before its phase has been affected by the fine phase shifter 27. This possibility is indicated in FIG. 3 by the demodulator 31*a* shown in dashed lines and connected from the output of the limiter 35 to a switch 73 which is so arranged as to connect the input of the band-pass amplifier 53 either to the output of the demodulator 31 or to the demodulator 31*a*. The arrangement shown in solid lines in FIG. 3 is preferable to that which would result by changing the position of the switch 73 from its indicated position, because the preferred arrangement would cause the system to reach an equilibrium condition when the undesired phase shift of the output signal 41 due to the tape speed perturbation has been eliminated. This result would follow since the phase comparator 29 would change the outputs $V_1$ and $-V_1$ of the threshold level source 51 to the precise levels which will cause the phase of the color burst portion of the output from the fine phase shifter 27 to return to its predetermined relationship relative to the reference waveform 49 from the time base 33.

On the other hand, if the basis for the phase comparison were the output 37 of the limiter 35, and not the output of the demodulator 31, then the phase comparator 29 and the threshold level source 51 would have to be carefully calibrated in order that they will always produce precisely the same reference levels for a given phase difference between the color burst portion of the input signal 37 and the time base reference signal 49. This would be so because there would be no feedback to indicate whether or not the system was successful in eliminating an undesired phase deviation of the system output signal 41 relative to the reference signal 49.

It should be observed that, regardless of which way the comparison is carried out, what is compared with the phase of the reference signal 49 from the time base 33 is a signal which is derived at least partly from the input signal 34 to the system. If the system is used in its preferred mode, the signal which is derived from the input is derived only partly therefrom, since it will also be derived partly from the output of the time base 33. Moreover, the derived signal, at the output of the demodulator 31 in this case, will be in phase with the bilevel output signal produced by the flip-flop 43 in response to alternate ones of the voltage ramps 39*a* and 39*b* reaching alternate ones of the pair of voltage levels $-V_1$ and $V_1$ produced by the threshold level source 51. If, on the other hand, the system of FIG. 3 is used in its less preferred mode of operation, the signal which is compared with the reference signal 49 will be derived entirely from and will be in phase with the input signal 34 to the system, so that the phase relationship represented by the pair of voltage levels $v_1$ and $-V_1$ which are used to control the generation of the bilevel signal is that between the phases of the input signal and the reference signal.

3. Details of the Exemplary System

Figure 5:
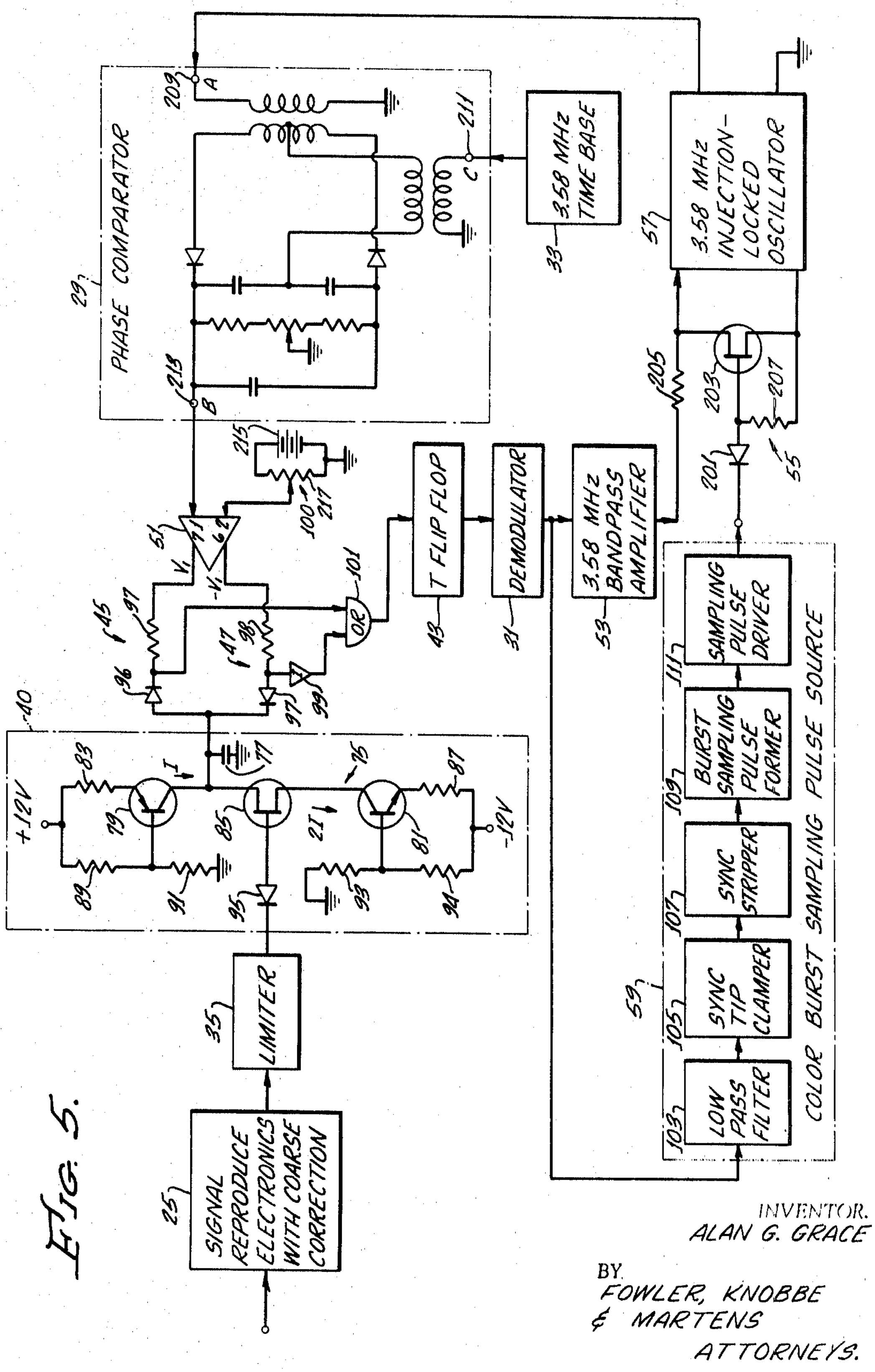
FIG. 5 is a more detailed block diagram of the system shown in FIG. 3.

The details of an exemplary system organized along the lines of the system of FIG. 3 are shown in FIG. 5.

*a*. The Ramp Generator

The ramp generator 40 is comprised of a bipolar current source 75, a capacitor 77, and means for causing current to flow into and out of the capacitor from the bipolar current source during alternate half cycles of the clipped video signal. The bipolar current source is comprised of two portions. One portion, which includes a transistor 79, serves to charge the capacitor 77 at a constant rate of current I. The other portion, which includes a transistor 81, serves to discharge the capacitor at a constant current rate of one I by drawing a constant current of two I, one I from the transistor 79 and one I from the capacitor 77.

One plate of the capacitor 77 is connected to ground. The other plate is connected directly to the collector of the transistor 79 whose emitter is connected through a resistor 83 to a +12 volt supply. The same plate of the capacitor is also connected indirectly through an FET switch 85 to the collector of the transistor 81 whose emitter is connected to a −12 volt source through a resistor 87. The base of transistor 79 is connected to the junction of a pair of biasing resistors 89 and 91 which are connected in series between ground and the +12 volt supply and whose values are selected to cause a constant current of one I to flow through the transistor. In a similar manner, the base of transistor 81 is connected to the junction point of another pair of resistors 93 and 94 connected in series between ground and the −12 volt supply. The latter resistors are proportioned to cause a constant current of two I to flow through the transistor 81 when the state of the FET switch 85 permits it. Through a diode 95, the gate electrode of the FET switch 85 is connected to receive the output of the limiter 35 so that the switch 85 closes at the instant when the signal 37 at the output of the limiter 35 crosses zero in a positive direction, and remains closed until it again crosses zero in a negative direction. Accordingly, at the instant when the squared video signal 37 at the output of the limiter 35 crosses zero in a positive direction, the diode 95 is cut off and the FET switch 85 becomes nonconductive. As a result, no current flows through the transistor 81 and a current of one I is driven through the transistor 79 into the capacitor 77, causing a positive voltage ramp to be developed across that capacitor. This voltage ramp continues until the capacitor is clamped by means which will be described shortly. Subsequently, when the signal 37 crosses zero in a negative direction, the diode 95 is rendered conductive and so is the FET switch 85. As a result, a constant current of two I is drawn through the transistor 81, thereby causing a net constant current of one I to be taken out of the capacitor 77. This causes a negative-going voltage ramp to be developed across the capacitor 77, decreasing the voltage across that capacitor from the level to which it was clamped at the end of the preceding positive-going voltage ramp. The negative-going voltage ramp continues until the voltage across the capacitor 77 drops to a second predetermined level, at which time the voltage is clamped at that level across the capacitor 77 until the next positive-going voltage ramp.

The voltage across the capacitor 77 is applied to the threshold detectors 45 and 47. The threshold detector 45 includes a diode 96 whose anode is connected to the capacitor 77 and whose cathode is connected through a resistor 97 to receive the first reference voltage level $V_1$. The other threshold detector 47 comprises a diode 97 whose cathode is connected to receive the voltage across the capacitor 77 and whose anode is connected through a resistor 98 to receive the other reference voltage level $-V_1$.

As the voltage across the capacitor 77 rises in the form of a positive-going ramp, the potential on the anode of the diode 96 approaches the reference potential $V_1$ being applied to its cathode through the resistor 97. When the voltage on the anode of the diode 96 exceeds that at its cathode by a sufficient amount, typically 0.65 volts, the diode conducts and prevents the voltage at its anode from going any higher. Also, a positive pulse appears at the cathode of the diode 96, and this pulse is applied through an OR gate 101 to the flip-flop 43 so as to reverse its state at the instant when the voltage across the capacitor 77 reaches a predetermined relationship relative to the reference voltage $V_1$, i.e. that relationship which causes the diode 96 to conduct. The flip-flop 43 is preferably of the complementary, or toggle type, which reverses its state with each succeeding pulse at its input.

Referring to FIG. 4, the voltage across the capacitor 77 remains clamped at $V_1$ (for simplicity, the voltage drops across the diode 96 and across the resistor 97 are ignored) until the squared video waveform 37 at the output of the limiter 35 crosses zero in a negative direction. At this time the voltage across the capacitor 77 begins to diminish linearly, as shown by the negative-going voltage ramp 39*a*, and continues to do so until the voltage at the cathode of the diode 97 is sufficiently below that at its anode to cause the diode to conduct. This will occur when the voltage ramp 39*a* has dropped slightly below the voltage reference level $-V_1$ but, again for simplicity, in FIG. 4 the voltage drops across the resistor 98 and across the diode 97 are ignored and the voltage across the capacitor 77 at the end of the negative-going ramp 39*a* is shown to become clamped at $-V_1$.

When the diode 97 conducts, a negative pulse is produced at the anode of the diode 97. This negative pulse is converted into a positive pulse by an inverter 99 and is applied to a second input of the OR gate 101 so as to reverse the state of the T flip-flop 43 each time the negative-going voltage ramp 39*a* reaches a predetermined relationship relative to the reference voltage level $-V_1$.

*b*. The Threshold Level Detectors

The reference voltage levels $V_1$ and $-V_1$, which are of equal magnitude but opposite polarity, are derived from a single phase error voltage level by means of the dual threshold level source 51. Circuits for achieving this function are known to those skilled in the art, but one which is particularly suitable is a differential video amplifier manufactured by Fairchild Semiconductor Company under the model No. A733, an integrated circuit. The phase error signal is applied to input no. 1 of a differential amplifier 51 while input no. 2 of the amplifier receives the output of a bias source 100, which is operative to apply a variable DC voltage level to the differential amplifier 51. The voltages which appear at the outputs 6 and 7 of the differential amplifier 51 are equal in magnitude, opposite in polarity and vary in proportion to the potential difference between the inputs 1 and 2 of the amplifier. Consequently, by adjusting the voltage applied from the bias source 100 to input no. 2 of the differential amplifier 51, the reference levels $V_1$ and $-V_1$ produced at its output can be adjusted to desired values when the phase error signal at input 1 of the amplifier is at the level where it is maintained when the video input signal to the system is properly phased relative to the reference signal 49 of the system. It has been found advantageous to make this adjustment such that, when the aforesaid signals are in proper phase, the magnitudes of the reference voltages $V_1$ and $-V_1$ are such that the voltage ramps 39*a* and 39*b* produced across the capacitor 77 take up approximately a quarter cycle of the input signal for the highest frequency component of the video signal. This setup is illustrated in FIG. 4 for the input waveform 71 and the voltage ramp waveform 73 associated therewith.

Figure 6:
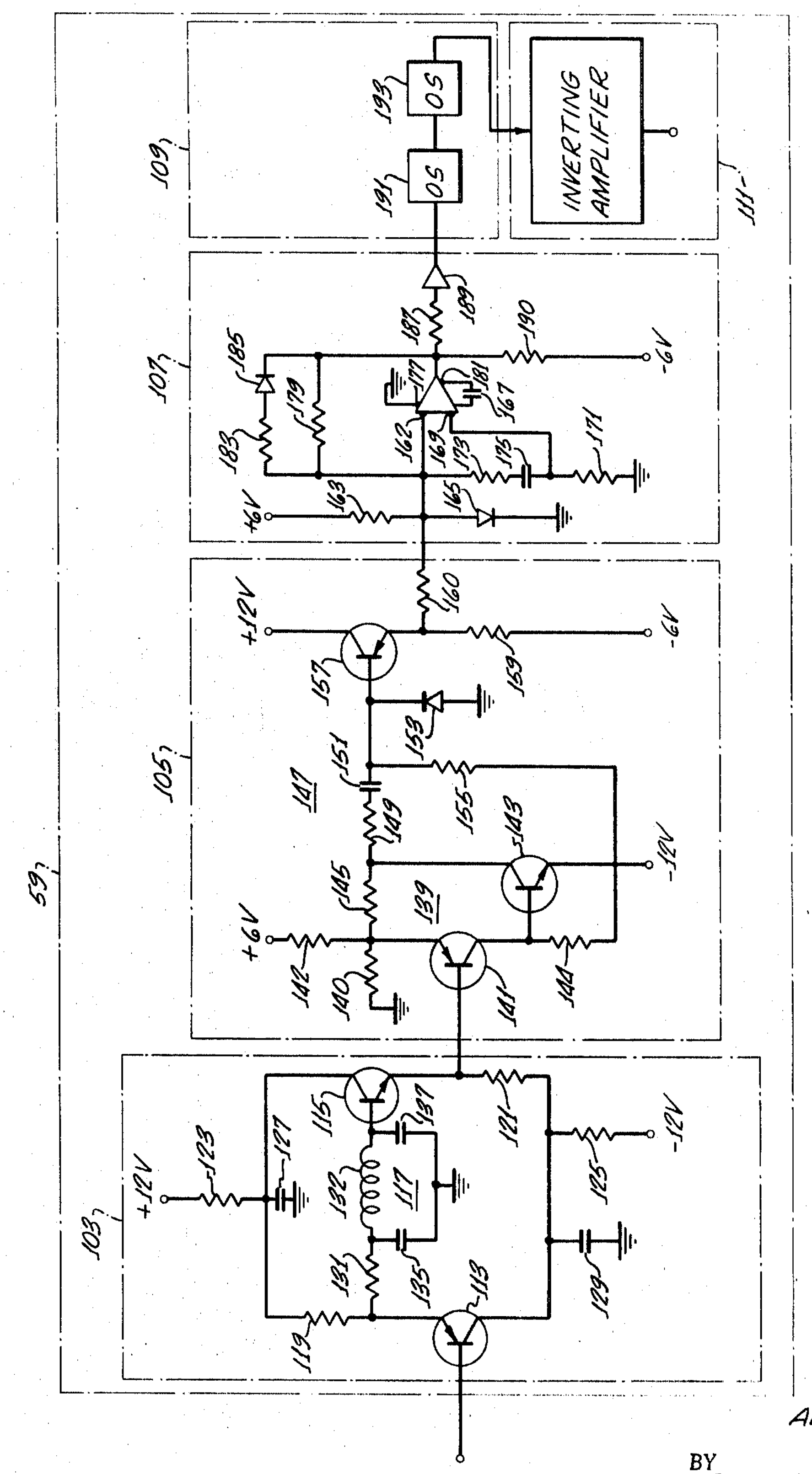
FIG. 6 is a circuit diagram of some of the blocks shown in FIG. 5.

In summary, as alternate ones of the positive-going and negative-going voltage ramps across the capacitor 77 reach a predetermined relationship with respect to the respective voltage levels $V_1$ and $-V_1$, alternate ones of the detectors 45 and 47 produce an output. These outputs are applied through the common OR gate 101 to the input of the flip-flop 43. Alternate signals at its input cause the flip-flop 43 to assume alternate ones of its two stable states. The output of the flip-flop 43, which is a frequency modulated composite video waveform, is applied to the demodulator 31, which is a conventional circuit for converting a frequency modulated signal to an amplitude modulated signal. Thus, what appears at the output of the demodulator 31 is an amplitude modulated composite video waveform like that shown in FIG. 2*a*. Although the waveform shown in FIG. 2*a* was used earlier to represent the composite video input signal at the output of the reproduce electronics 21, the same waveform will also be used to represent the output of the demodulator 31, since the outputs of those two units are indeed the same, except that the output of the unit 31 is slightly delayed relative to the output of the unit 21. This signal is applied to the 3.58 MHz. bandpass amplifier 53 as well as to the color burst sampling pulse source 59. The details of the latter are shown in FIG. 6.

*c*. The Color Burst Sampling Pulse Source

1. In General

Briefly, the video signal at the output of the demodulator 31 is applied to a low-pass filter 103, which forms the first stage of the color burst sampling pulse source 59. It is the function of the color burst sampling pulse source 59 to detect the trailing edge of the horizontal sync pulse component 13 of the composite video waveform 11 at the output of the demodulator 31 and to derive from that trailing edge a precisely timed gating or sampling pulse which overlaps in time the color burst portion 15 of the composite video waveform. This sampling pulse is then used to turn on a gate through which the filtered output of the demodulator 31 is passed. In this manner, since the gate is opened only while the color burst is being applied to it, only the color burst portion of the composite video waveform is passed through the gate and to the input of the injection locked oscillator 57. The low-pass filter 103 serves to remove from the composite video waveform 11 the high frequency components of that signal, including the color burst 15 and the video signal 17. The filtered video signal at the output of the filter 103 is applied to a sync tip clamping circuit 105 which forms the second stage of the color burst sampling pulse source 59. In this stage the negative-going peaks of the horizontal sync pulses 13 are clamped to a predetermined level, thereby clamping the black level of the composite video signal indirectly. The clamped signal is then fed to a sync stripper 107 forming the third stage of the sampling pulse source 59 and serving to amplify the horizontal sync pulses 13, while attenuating further the video component of the amplified signal. Timing signals are then derived by applying the output of the sync stripper 107 to a burst sampling pulse former 109 wherein the sampling pulses are derived from the amplified horizontal sync pulses. These pulses are applied to a sampling pulse driver 111, forming the last stage of the color burst sampling pulse source 59 and serving further to amplify the sampling pulse, and to invert it.

2. In Detail

Referring now to FIG. 6 for a more detailed description of the color burst sampling pulse source 59, the low-pass filter block 103 is comprised of transistors 113 and 115, each connected as an emitter follower and an L-C filter 117 through which the output of the first transistor is applied to the input of the second. The primary function of the transistors 113 and 115 is to prevent a low-impedance source and a high-impedance load to the filter 117. In addition, the transistors 113 and 115 are so arranged that the DC level of the composite video waveform, which is applied to the base of the transistor 113, is preserved at the output taken from the emitter of transistor 115 The transistor 113 is a PNP device whose emitter is connected through a load resistor 119 to the collector of the transistor 115, which is an NPN device whose emitter is connected through a load resistor 121 to the collector of the transistor 113.

The two transistors 113 and 115 are connected between a source of positive voltage and a source of negative voltage, respectively shown as +12 volts and −12 volts, through common isolating resistors 123 and 125, and their collectors are connected to ground through a pair of isolating capacitors 127 and 129 respectively. The output of the first emitter follower transistor 113 is taken from its emitter and is applied through a coupling resistor 131 and through the filter 117 to the base of the second emitter follower transistor 115. The filter 117, comprised of an inductor 132 and a pair of capacitors 135 and 137, has a cutoff frequency of about 1.8 megacycles and is effective to eliminate all of the color information from the composite video waveform which is coupled through it from the transistor 113 to the transistor 115. To avoid a change in the DC voltage level in the composite video waveform as it passes through the filter block 103 the emitter load resistors 119 and 121 associated respectively with the transistors 113 and 115 are selected to have the same value. Consequently, the DC currents through the transistors 113 and 115 will be equal and the DC voltage rise across the base-emitter junction of the transistor 113 will be exactly offset by the DC voltage drop across the base emitter junction of the transistor 115.

The filtered composite video waveform appearing at the output of the low-pass circuit 103 is shown in FIG. 2*c* as the waveform 138. It is applied to a noninverting feedback amplifier 139 in the sync tip clamper 105. Comprised of a pair of transistors 141 and 143, the amplifier 139 has a gain of about three and includes a feedback path through a resistor 145 from the collector of the output transistor 143 to the emitter of the input transistor 141.

The amplified, noninverted facsimile of the composite signal appearing at the collector of the transistor 143 is applied to a clamping circuit 147.

The clamping circuit 147 includes a resistor 149, a capacitor 151, and diode 153, all connected in series between the collector of the transistor 143 and ground, and also includes a resistor 155 connected from the junction point of the capacitor 151 and the diode 153 to the −12 volt source. The signal which is applied to the clamping circuit 147 is reproduced at its output, except that the negative-going excursions of the signal are clamped at approximately −0.65 volts due to the clamping action of the diode 153. The voltage appearing across the diode 153 is applied to the base of an emitter follower transistor 157 whose collector is connected to the +12 volt source and whose emitter is connected to a −6 volt source through a load resistor 159. The output of the sync tip clamper 105 appears across the load resistor 159 and is shown in FIG. 2*d* as the waveform 160. The tips of the amplified sync pulses 13*b* produced at the output of the sync tip clamper 195 are fixed at a level of −1.3 volts. It was noted earlier that the sync tip level at the base of the transistor 157 is clamped at −0.65 volts by the diode 153. An additional drop of 0.65 volts is sustained by the signal through the base-emitter junction of the transistor 157. Hence, the sync tip level at the emitter of the transistor is about −1.3 volts.

The clamped signal 160 is applied through a coupling resistor 160 to the inverting input 162 of an operational amplifier 161 whose function is to detect the amplified sync pulses produced by the sync tip clamper 105. By itself the operational amplifier 161 would produce a positive-going input whenever the signal at its inverting input drops below zero volts. It is desirable, however, to make the threshold level of the operational amplifier more negative than that in order to prevent it from producing output signals in response to spurious negative noise signals appearing at its input. For this reason the inverting input 162 of the operational amplifier 161 is connected to a +6 volt source through a biasing resistor 163 which is operative to feed a biasing current to the amplifier such that the input voltage to the amplifier will be zero volts when the output voltage at the emitter of the transistor 157 is at approximately −0.6 volts. Only if the voltage at the emitter of transistor 157 drops below that level will the amplifier 161 produce an inverted or positive-going signal. In this way, a threshold level of −0.6 volts is established for the operational amplifier. Additionally, the inverting input 159 is clamped to ground through a diode 165 to prevent the input from being driven above 0.65 volts.

The Fairchild type 709 integrated circuit has been found to be suitable for use as the operational amplifier 161, and the various supply and biasing components and voltages shown in FIG. 6 are those which are suitable for use with that type of amplifier. In particular, a phase control capacitor 167 is connected across a pair of terminals of the amplifier to set the phase of the output signal of the amplifier relative to the phase of the input signal thereto. The noninverting input 169 of the amplifier is connected to ground through a resistor 171 and a resistor 173 is connected in series with a capacitor 175 across the inverting and noninverting inputs 162 and 169 of the amplifier. A ground connection is also provided for the amplifier at its terminal 177.

The gain of the operational amplifier 161 for negative-going signals, and in particular for the amplified sync pulses, is determined by the input resistor 160 and by a feedback resistor 179 connected between the output 181 of the amplifier and its inverting input 162. As is well known, the gain of an operational amplifier is the ratio of the resistance values of its feedback resistor divided by its input resistor. In the exemplary embodiment, it may be assumed that the feedback resistor 179 has a value of 27 kilohms and that the input resistor 160 has a value of 2 kilohms, making the gain of the amplifier for negative-going input signals 13.5. To attenuate positive-going input signals to the amplifier 161, and in particular the video signal which appears in the signal from the sync tip clamping circuit 105, an additional feedback loop comprising a resistor 183 in series with a diode 185 is connected between the inverting input 162 and the output 181 of the operational amplifier 161. The diode 185 is poled for current conduction from the input 162 to the output 181 so that, for negative-going input signals the diode is reverse biased and the feedback loop of which it is a part is inoperative. However, during the positive-going portions of the filtered composite video waveform received by the sync stripper 107 the diode 185 is forward biased, thereby connecting the resistor 183 in parallel with the feedback resistor 179. By choosing a value of 3.3 kilohms for the resistor 183, the resultant resistance value between the output 181 and the input 162 of the operational amplifier 161 will be reduced to approximately 3 kilohms during the positive-going portions of the filtered composite video signal, thereby reducing the gain of the amplifier to 1.5. Thus, while the negative-going excursions of the filtered composite video signal from black level are greatly amplified, the positive-going excursions, representing the video component of the composite signal, are amplified only slightly. As a result, the signal which appears at the output of the operational amplifier 161 is comprised of positive-going pulses of approximately 6 volts, corresponding to the negative-going horizontal sync pulse component of the filtered composite video waveform being applied to the sync stripper 107 and negative-going excursions corresponding to the video portions of that signal of only a few hundred millivolts. This output signal is applied through a resistor 187 to an inverter 189.

The inverter 189 has a threshold of approximately +1 volt so that it does not reproduce the small video component of the signal which is applied to its input from the operational amplifier 161. It does, however, reproduce the large positive-going sync pulse excursions which appear at the output of the operational amplifier 161 and these appear at the output of the inverter as a series of negative-going pulses having a magnitude of approximately −3 volts. These pulses are shown in FIG. 2*e* as the waveform 190.

The −3 volt negative-going pulses 190 are applied to a one-shot 191, which is triggered on the positive-going trailing edge of each −3 volt pulse. The pulses produced by the one-shot 191, shown in FIG. 2*f* as the waveform 192, are applied to a second one-shot 193 which produces a train of pulses in response to the negative-going trailing edges of the positive-going pulses 192 produced by the first one-shot 191. It is the output of the one-shot 193, shown in FIG. 2*g* as the waveform 194, which is used as the burst sampling pulse after amplification by the sampling pulse driver 111. The first of the two one-shots, the one-shot 191, thus serves as a fixed delay for initiating the sampling pulses 194 produced by the second one-shot 193. The duration of the delaying pulse 192 produced by the first one-shot 191 is made sufficient to initiate the pulse produced by the second one-shot 193 shortly after the beginning of the color burst 15 of the video waveform 11. The duration of the pulse 194 produced by the second one-shot 193, on the other hand, is selected so as to terminate prior to the termination of the color burst 15.

The sampling pulses 194 produced at the output of the one-shot 193 are applied to the sampling pulse driver 111 which is simply an inverting amplifier, operative to produce a waveform 196 (FIG. 2*h*) at a positive level between pulses produced by the pulse former 109 and at a negative level during those pulses. The amplified sampling pulse 196 from the sampling pulse driver 111 is applied through a diode 201 to the gate electrode of a field effect transistor (FET) switch 203. The source electrode of the FET switch is connected to ground and its drain electrode is connected through a resistor 205 to the output of the 3.58 MHz. band-pass amplifier 53. A resistor 207 connects the gate electrode and source of the FET switch 203. Finally, the drain and source of the FET switch 203 are connected across the inputs of the 3.58 MHz. injection locked oscillator 57 so as to establish a short circuit between them when the FET switch is closed. When the FET switch 203 is open, the oscillator 57 is free to receive the output of the band-pass amplifier 53.

In operation, during the intervals between the amplified sampling pulses 196 the output of the sampling pulse driver 111 is at a positive level. This back biases the diode 201, raising the voltage at the gate electrode of the FET switch 203 to a sufficiently high level to turn it on fully, thereby establishing a very low impedance shunt across the inputs of the injection locked oscillator 57. During these intervals the output of the band-pass amplifier 53 is prevented from appearing across the inputs of the injection locked oscillator 57. At the beginning of the amplified sampling pulse 196 the output of the sampling pulse driver 111 goes negative, forward biasing the diode 201 so as to drop the voltage at the gate electrode of the FET switch 203, thereby turning it off. The short circuit is thus removed from between the inputs of the injection locked oscillator 57 and the output of the band-pass amplifier 53 is permitted to appear across them. This condition continues until the end of the amplified sampling pulse 196. Thus, it is seen that, since it is the color burst 15 which appears at the output of the band-pass amplifier 53 during the occurrence of the amplified sampling pulse 196, only the color burst portion of the composite video waveform is applied across the inputs of the injection locked oscillator 57.

The following components and component values will be found suitable for building the exemplary circuit of FIG. 6.

Resistors: (In Ohms)

| | |
|---|---|
| 119—1.8 K. | 155—180 K. |
| 121—1.8 K. | 160—2 K. |
| 123—220 | 163—15 K. |
| 125—220 | 171—1.8 K. |
| 131—1.5 K. | 173—68 |
| 140—430 | 179—27 K. |
| 142—620 | 183—3.3 K. |
| 144—330 | 187—1.5 K. |
| 145—820 | 188, 190—3.3 K. |
| 149—100 | |

Capacitors (in microfarads if less than 1; in picofarads if greater than 1).

| | |
|---|---|
| 127—.01 | 151—2.2 |
| 129—.01 | 167—50 |
| 135—36 | 175—3000 |
| 137—110 | |

Inductor:
132—240 microhenries

Transistors:

| | |
|---|---|
| 69, 203—2N 3638 | 205, 215—2N 3391 |
| 71—2N 3569 | 157—TIS 34 |

Diodes:
153, 165—1275-4101

*d*. The Injection Locked Oscillator

The details of a suitable injection locked oscillator are described at pages 175—177 of the Fairchild Semiconductor Linear Integrated Circuits Application Handbook, Library of Congress Cat. No. 67-27446 published by the 67-27446, Semiconductor Company.

*e*. The Phase Comparator and Time Base Units

The output of the 3.58 MHz. injection locked oscillator 57 is applied to one input of the phase comparator 29. At its other input the phase comparator 29 receives the output of the 3.58 MHz. time base 33. It is the function of the phase comparator 29 to produce an output which is representative of the relative phases of the 3.58 MHz. signals from the injection locked oscillator 57 and from the time base 33. Suitable phase comparators for this purpose are well known. One of them is that illustrated in FIG. 5. Its output appears between ground and an output terminal 213 and varies in proportion to the phase difference between the signals applied to its inputs 209 and 211. The output 213 of the phase comparator 29 is connected to input no. 1 of the differential amplifier 51. Input no. 2 of the differential amplifier 51 is connected to the bias source 100, shown as comprising a DC voltage source 215 and a resistor 217 connected across the voltage source.

The time base 33 need not be discussed in detail, since suitable time base circuits, typically crystal controlled oscillators, are widely available.

What I claim is:

1. In a system for compensating for the drifting of an alternating input signal from a predetermined phase relationship with respect to an alternating reference signal, the combination comprising:

a. means for generating alternately positive-going and negative-going voltage ramps during alternate half cycles of said input signal;
b. means for producing a pair of voltage levels representative of the phase relationship between said reference signal and a signal derived at least partly from said input signal; and
c. means for generating a bilevel signal whose value is changed between its two levels in response to alternate ones of said voltage ramps reaching alternate ones of said pair of voltage levels.

2. The combination of claim 1 further characterized in that said means for generating voltage ramps is comprised of a bipolar current source, a capacitor, and means for causing current to flow into and out of said capacitor from and to said bipolar current source during alternate half cycles of said input signal.

3. The combination of claim 1 further characterized in that said means for producing a pair of voltage levels representative of the phase relationship between said input signal and said reference signal includes:

a. a phase comparator for producing a phase error signal which is representative of said phase relationship; and
b. means for deriving from said signal a pair of voltage levels of equal magnitude by opposite polarity, with the potential difference between said voltage levels varying as a function of said phase error signal.

4. The combination of claim 3 wherein said means for deriving a pair of voltage levels includes a differential amplifier.

5. The combination of claim 1 characterized further in that the signal which is derived from said input signal is in phase with said bilevel signal so that the phase relationship represented by said pair of voltage levels is that between the phase of said reference signal and the phase of said bilevel signal.

6. The combination of claim 1 characterized further in that the signal which is derived from said input signal is in phase with said input signal so that the phase relationship represented by said pair of voltage levels is that between the phases of said input signal and said reference signal.

7. In a system for compensating for the drifting of an alternating input signal from a predetermined phase relationship with respect to an alternating reference signal, the combination comprising:

a. means for generating two series of voltage ramps, the ramps of the respective series being initiated during alternate half cycles of said input signal;

b. means for producing a bilevel output signal with alternates between a pair of levels in response to the respective voltage ramps of said first and second series reaching alternate ones of the pair of voltage levels; and c. means for generating said voltage levels as a function of the relative phases of said output signal and said reference signal.

8. The combination of claim 7 wherein said two series of voltage ramps are part of a single waveform whose value alternates between said pair of voltage levels.

9. The combination of claim 7 wherein said means for generating two series of voltage ramps includes:

a. a bipolar current source;

b. a capacitor; and c. means for charging and discharging said capacitor through said current source during alternate half cycles of said input signal so as to create alternately positive-going and negative-going voltage ramps across said capacitor.

10. The combination of claim 7 wherein said means for producing a bilevel output signal includes:

a. a bistable signal source; and b. first and second threshold means, each for reversing the state of said bistable signal source in response to the voltage ramps of the respective ones of said series of voltage ramps reaching a predetermined relationship relative to a respective one of said voltage levels.

11. The combination of claim 7 wherein said means for generating said voltage levels includes:

a. a phase comparator for producing a phase error signal which is representative of the relative phases of said output signal and said reference signal; and b. means for deriving from said error signal a pair of voltage levels of equal magnitude but opposite polarity.

12. The combination of claim 11 wherein said means for deriving said pair of voltage levels includes a differential amplifier receiving said error signal at its input and producing said pair of voltage levels at its outputs.

13. In a system for compensating for a change of a phase modulated composite color video waveform from a predetermined phase relationship with respect to an alternating reference signal, the combination comprising:

a. means for generating two series of voltage ramps, successive ramps of the respective series being initiated in response to successive zero crossings of the video signal component of said composite color video waveform in a given direction;

b. means for producing an alternating output signal which crosses zero in a given direction in response to successive ramps of one of said series reaching a first reference level and which crosses zero in the opposite direction in response to successive ramps of the other of said series reaching a second reference level; and c. means for generating said first and second reference levels as a function of the relative phases of said output signal and said reference signal.

14. In a system for compensating for a change of a phase modulated composite color video waveform from a predetermined phase relationship with respect to an alternating reference signal the combination comprising:

a. means for generating two series of voltage ramps, successive ramps of a given one of said series being initiated in response to successive zero crossings of the video signal component of said composite color video waveform in a given direction;

b. means for producing an alternating output signal which crosses zero in a given direction in response to successive ramps of a given one of said series reaching a first reference level, and which crosses zero in the opposite direction in response to successive ramps of the other one of said series reaching a second reference level, the magnitude of said reference levels being such that each zero crossing of said video signal component causes a corresponding, but delayed, zero crossing of said output signal;

c. means for comparing the phase of that portion of the output signal which corresponds to the color burst carried by said composite color video waveform with the phase of said reference signal; and d. means responsive to said comparing means for producing said first and second reference levels as a function of the relative phases of the compared signal.

15. In a method for compensating for the drifting of an alternating input signal from a predetermined phase relationship with respect to an alternating reference signal the steps of a. generating two series of voltage ramps, one series in response to positive and the other in response to negative-going zero crossings of the input signal;

b. generating an output signal having positive-going and negative-going zero crossings initiated in response to said first and second series of ramps reaching first and second preset voltage levels respectively; and c. altering said first and second voltage levels as a function of the phase of said output signal relative to the phase of said reference signal.